3,572,417
METHOD FOR CASTING METALS IN FOAMED INORGANIC REFRACTORY MOLDS
Marco Wismer, Gibsonia, Pa., assignor to
PPG Industries, Inc., Pittsburgh, Pa.
Filed Nov. 2, 1967, Ser. No. 680,031
Int. Cl. B22c 1/22; B29d 27/04; C04b 35/10
U.S. Cl. 164—43                                              29 Claims

ABSTRACT OF THE DISCLOSURE

This invention relates to casting or molding metals wherein the mold comprises a refractory inorganic oxide foam which has been formed by heating a filled organic foam at a temperature and for a time sufficient to substantially decompose the organic binder to a carbonaceous state, or, alternatively, to substantially completely consume the organic binder to form a refractory inorganic foam.

---

The casting or molding of metals is an extremely old art, yet many of the techniques or materials have not substantially changed over long periods of time. The use of sand molds with external supports or flasks still remain the basis of the industry.

It has now been found that the refractory foams herein described provide extremely useful molds or portions of molds due to the excellent strength displayed by these materials.

These molds, due to their strength, are less susceptible to erosion at points of entry or turbulence, and may be self-supporting with proper design. Likewise, the materials of the invention may be easily cut or machined to produce accurate configurations.

Another advantage is the fact that the mold materials of the invention are of extremely low density as compared to conventional solid refractories, and have varied thermal conductivity, especially low thermal conductivity depending on the density of ingredients employed.

The foams of the invention are especially useful in casting intricate shapes, as well as in gate construction, and mold top or hot top construction since it is desirable to maintain the head or reservoir of metal in a molten state while the mold progressively cools in order to avoid shrinkage voids or internal stresses.

The refractory inorganic oxide foams which comprise the molds of the instant invention are disclosed in applications Ser. Nos. 106,291, filed Apr. 28, 1961 (now abandoned); 438,826, filed Mar. 3, 1965; 500,420, filed Oct. 21, 1965; and 510,336, filed Nov. 29, 1965, which are assigned to the assignee of the present application and all of which are now abandoned as well as Canadian Pat. 694,095 and British Pat. 1,033,560. As disclosed therein, green precursor foams are prepared from a foamable mixture comprising a member of the group consisting of an organic unsaturated polyester resin binder and a blowing agent or an organic isocyanate-terminated prepolymer resin binder, a catalyst which promotes isocyanurate formation and a blowing agent, as in conventional foamable mixtures; but further containing, in appropriate amounts and in pulverulent state, a relatively refractory inorganic material, a flux for said refractory material, and preferably a heat-resistant fibrous material.

Exposure of these foams to temperatures sufficiently high to char the organic materials will convert the resins to a carbonaceous char which retains, at least to a large extent, the original cellular structure of the initial foam. The carbonaceous structure derived by charring the resin provides a good scaffold for the refractory material and flux.

If the charred foam is heated to a higher temperature, the carbonaceous structure is gradually burned out of the foam and the particles of the refractory material are united by sintering with the fluxing material to provide a coherent, strong cellular inorganic foam structure containing a substantial percentage of closed cells and wherein much of the structure of the original foamed organic scaffolding is retained.

Preferably, the refractory materials of the invention are prepared by heating the filled foam precursors under controlled conditions. For example, the foam is heated in an appropriate apparatus such as an electrically heated or gas-fired furnace whereby the organic binder is consumed, leaving its cellular carbonaceous char, which char serves as a scaffolding for the pulverulent refractory material. If desired, the char is converted by continued heating to a cohesive inorganic material comprising the refractory filler, the flux and fibrous material, now at least partially fused or sintered together, to provide a rigid cellular structure.

Many methods of heating of filled organic foam precursors may be used to produce the refractory foams of this invention. One method involves first placing the foam in an oven, preferably having a moderate forced air flow to carry off gaseous products, the temperature then gradually raised to the desired point and the temperature is then either continuously lowered or the heating is discontinued and the oven containing the inorganic foam allowed to cool to a relatively low temperature before removing the foam.

Another method is to place a sample in an oven heated to a temperature sufficient to char the organic binder without substantial conflagration of the organic binder. Temperature is usually in the range of about 600° F. to 1200° F.

In order to produce the inorganic foams of this invention, it is necessary to heat the organic or carbonaceous precursors to a temperature of at least about 1800° F., in the case of lower melting refractories such as silica, or from about 2600° F. to about 4000° F. or higher in the case of higher melting refractories such as alumina and zirconia, for a time sufficient to burn out the organic resinous binder or carbonaceous structure and to cause the remaining materials to be fused or sintered to coherent, substantially inorganic foam. Usually, the majority of the organic scaffolding is consumed at a temperature of about 800° F. to about 1800° F.

Preferably, the filled organic foam precursor is incrementally or continuously heated from its ambient temperature to the maximum or essential temperature over a period of time, and in such a manner that the temperature differential between the outer portions of the cellular body and the inner portions of the cellular body are not so great as to cause undue internal stress, which increases the chance of occurrence of fissures, cracking or lack of uniform structure. Preferably, the heating should not be so rapid as to cause substantial conflagration of organic binder due to attendant hot spots. Likewise, preferably, the inorganic foam is annealed after formation, that is, cooled at such a rate that undue internal stresses or thermal shock are avoided.

Still another method of firing the foam of this invention involves the use of a moving bed tunnel kiln such as is utilized in the ceramics industry wherein the temperature gradient increases toward maximum in the center of the kiln. This type of kiln is ideally suited for producing the type of inorganic foams contemplated by this invention.

RESINS FOR USE IN THE FOAMABLE MIXTURES

One of the resins which may be used in forming the foams is the class comprising thermosetting interpolymerizable unsaturated polyester-monomer mixtures. They preferably are initially liquids or can be rendered liquid by incorporation of appropriate polymerizable or vaporizable diluents. They are of thermosetting character. That is, they do not tend to melt down when subjected to heat, but rather tend to become hard. These resins will usually char or burn up without actually melting, or if subjected to a sufficiently high temperature, will give a carbonaceous skeleton still loaded with the pulverulent fill materials and still characterized by much of their original cellular structure. Also, they usually will adhere to the substrates to which they are applied.

Especially satisfactory thermosetting resinifiable polyester-monomer mixtures for use as the organic component in the foams of this invention comprise foamable inter-polymerizable mixtures of a so-called unsaturated polyester and a $>C=CH_2$ monomer of the type represented in U.S. Pat. No. 2,593,787 to Parker. In these systems, the polyester contains as an initial component at least a portion of an alpha, beta-ethylenic dicarboxylic acid, but the polyester need not necessarily be the sole acid. Various unsaturated dicarboxylic acids or acids which are functionaally saturated may be present. Such functionally saturated dicarboxylic acids include phthalic acid, isophthalic acid, terephthalic acid, endomethylenetetrachloro- and endomethylenetetrabromophthalic acid, and aliphatic dicarboxylic acids represented by succinic acid, adipic acid, sebacic acid and others. In proportioning the two types of acids in the polyester, the molecular ratio of the functionally saturated component may vary in a range of about 0.25 mole to about 6 moles per mole of the ethylenically unsaturated component. The acid (or anhydride) component is esterified with a dihydric alcohol, such as ethylene glycol, propylene glycol, 1,2-butylene glycol, diethylene glycol, triethylene glycol, dipropylene glycol or other glycols, in an amount usually slightly (e.g., 1 percent to 10 percent) in excess of equivalency of the acid component.

Another method of preparing the unsaturated polyesters employed in the foams of this invention comprising the reaction of an alpha, beta-ethylenic dicarboxylic acid or anhydride, as set forth above, and an organic oxide which may be regarded as being an anhydride of the corresponding glycol, i.e., a compound containing an oxirane ring. For example, see U.S. Pat. 2,822,350 and copending application Ser. No. 231,767, filed Oct. 19, 1962, and now Pat. No. 3,374,208.

The unsaturated polyesters obtained in any of the foregoing manners may be mixed with various monomers containing a $>C=CH_2$ group, as disclosed in the foregoing Parker patent. Styrene or vinyl toluene, methyl methacrylate and chlorostyrene, as well as others disclosed, may be used. The monomers may be added in an amount varying within a range of about 10 percent to about 40 percent based upon the polyester-monomer mixture.

Most polyester-monomer mixtures include a small amount, e.g., about 0.001 percent to about 1 percent, of a gelation inhibitor, such as quinone, hydroquinone, tertiary butyl catechol, and 3-isopropyl catechol. They may also include small amounts of quaternary ammonium salts. These often act in uncatalyzed mixtures as gelation inhibitors (see U.S. Pat. No. 2,593,787 to Parker), or, when the mixture is catalyzed, as gelation promoters (see U.S. Pat. No. 2,740,765 to Parker). Other auxiliary ingredients may be included, for example, to speed up curing. The mixture is catalyzed by the addition of such well-known peroxidic catalysts as methyl ethyl ketone peroxide, cumene hydroperoxide, benzoyl peroxide and others. The catalyst may be used in an amount of about 0.1 percent to about 5 percent by weight based upon the interpolymerizable components.

If the mixture is to be cured at low temperatures, for example, at room temperature, it is advantageous to add an accelerator, such as one of the siccatives used in the drying of oil-based paints.

These include salts of cobalt, copper, lead, nickel, chromium, and higher fatty acids such as octoic acid, oleic acid, naphthenic acid, amines, for example, diethylaniline, and others. These catalysts are not always necessary, especially if the mixtures can be heated to a substantial temperature.

It is often desirable to include in the foamable mixture an appropriate wet agent designed to improve the wet strength of films formed in the foaming operation and, thus, to give stability to the freshly formed foams until partial setting of the resinifiable components is attained. Such foam stabilizers are well recognized in the art and are represented by such materials as cellulose acetate butyrate, ethyl cellulose, benzyl cellulose, chlorinated natural rubber and others.

Another resin which may be used in forming the foams of this invention are the class comprising isocyanate prepolymer resins, that is, the reaction product of polyols having hydroxyl values between about 100 and about 2000, with an excess of a diisocyanate to yield an isocyanate-terminated polymer called a prepolymer. Prepolymers are a well-known class of materials which have developed in the art of polyurethane foams. These prepolymers are preferably initially liquid. They are thermosetting upon further reaction. That is, they do not tend to melt down when subjected to heat, but rather tend to become hard. These resins will usually char or burn up without actually melting and, if subjected to sufficiently high temperature will give a carbonaceous skeleton still loaded with the pulverulent fill materials and still characterized by much of the original cellular structure. Also, they will usually adhere to substrates to which they are applied.

The prepolymers are converted into isocyanurate resins by the use of an appropriate catalyst. These catalysts are known in the art and constitute the class of catalysts which trimerize simple diisocyanates to form isocyanurates.

Polyurethane foam prepolymers are a well-known class of materials and are generally described by Saunders and Fritsch, Polyurethanes, Chemistry and Technology, Part II, Interscience Publishers, London and New York (1964), pages 8–48 and 201–202. Preferably, the polyol is a polyester of polyether polyol, although other polyols suitable for mixing with diisocyanates to form prepolymers, such as nitrogen-containing polyols, may be employed. In addition, preferably the polyol has a low acid value and substantial hydroxyl value.

When a polyester is employed as a polyol, it should be soluble and liquid or fusible. Such polyesters are prepared by condensation of a dicarboxylic acid and a polyhydric alcohol.

Appropriate acids for use in the preparation of polyesters comprise dicarboxylic acids such as phthalic acid, terephthalic acid or isophthalic acid or their homologs and chloroderivatives. Still other acids such as those containing aliphatic chains may be used. Examples of such acids include succinic acid, adipic acid, sebacic acid, azelaic acid and the like. Blends of various acids may also be used. It is to be recognized that the term "dicarboxylic acid" also includes the anhydrides of the acids since the anhydrides form the same esters as the free acids. In many instances, it is preferable to work with the anhydride rather than the acid.

At least a portion of the saturated acids may be replaced by acids containing alpha-ethylenic unsaturation such as by the use of maleic acid or itaconic acid.

The polyhydric alcohol employed may be a polyhydric or dihydric alcohol. In order to obtain a rigid foam, usually a relatively high ratio of polyhydric alcohol is employed. In fact, the alcohol component may be exclusively polyhydric. Examples of polyhydric alcohols include glycerol, penaerythritol, trimethylolethane, trimethylolpropane, mannitol, and others. Examples of dihydric alcohols include ethylene glycol, trimethylene glycol, and in some instances, polyethylene glycol of relatively high molecular weights. Blends of two or more of such alcohols may be used. Usually the alcohol is employed in substantial excess, e.g., 5 to 20 percent excess over the total of the carboxyl groups available in the reaction mixture from which the polyester is derived.

The reaction of esterification between the polyhydric alcohol and the dibasic acid components of the mixture is conducted in accordance with conventional procedure by heating a mixture, often in the presence of an inert diluent such as xylene in a reflux process to evolve and remove water. The reaction is continued until the desired viscosity and acid number are obtained. Since the preparation of such polyesters is a well-recognized art, elaboration on the mode of conducting the esterification reaction is not deemed necessary.

Another large group of polyols which are conventionally used in forming polyurethane foam prepolymers are polyether polyols. These polyether polyols are usually alkylene oxide adducts of diols, triols or higher functional alcohols. In a large number of these adducts, propylene oxide is first added to the alcohol and then, if primary terminal hydroxyl groups are desired, the polyoxypropylene derivatives are "capped" with ethylene oxide. Particularly useful polyether polyols are polyether polyols which are derived by reacting an alcohol containing many functional groups, such as sucrose or sorbitol.

Polyether polyols, as well as prepolymer formation are generally described by Gaylord, Polyethers High Polymer Series, volume XIII, Part I, Interscience Publishers, New York and London (1963).

The prepolymer is made by mixing the polyol component with a wide variety of diisocyanates in such amounts as to provide substantial excesses of diisocyanate molecules as compared with available hydroxyl groups. Examples of such isocyanates include chlorophenyl 2,4-diisocyanate; ethylene diisocyanate; 1,4 - tetramethylene diisocyanate; para-phenylene diisocyanate; toluene diisocyanate (usually a mixture of isomers); para, para'-diisocyanate diphenylmethane and hexamethylene diisocyanate, among others.

In preparing a prepolymer of a polyol and a diisocyanate, it is preferable that the polyol and the diisocyanate be proportioned depending upon the available hydroxy groups of the polyol. Usually the diisocyanate will be employed in the ratio to provide about .90 to about 2.2 moles of diisocyanate per equivalent of combined hydroxyl and carboxyl in the polyol prepolymer component. The reaction of the polyol and the diisocyanate may be conducted in the presence or the absence of a catalyst. The formation of polyurethane prepolymers and the methods employed are well-known in the art and it is not deemed necessary to set forth these conditions in detail.

The isocyanurate foams which comprise the organic binders utilized to form the refractory foams of the instant invention are prepared by foaming a polyurethane foam prepolymer in the presence of a trimerization catalyst in order to prepare isocyanurate foams.

Polyisocyanurate foams are known in the art. For example, methods of preparing isocyanurate foams are described in U.S. Pats. 2,993,870; 3,154,520, and 3,180,846, as well as being described by Nicholas et al., Journal of Cellular Plastics, January 1965.

The catalysts employed to trimerize isocyanates to form isocyanurates may be selected from those known in the art. Generally, those compounds which trimerize molecular isocyanates to form simple isocyanurates have shown some activity in polymerizing macromolecular isocyanates to form polyisocyanurates. Catalysts which have shown in the art to have activity in polymerizing and trimerizing isocyanates include triethylphosphine, epoxides, amines, salts of weak organic acids, acidic catalysts such as aluminum chloride and oxalic acid, quaternary hydroxides of nitrogen, phosphorus, arsenic and antimony and alkali metal alkoxides. Epoxides are particularly effective in the presence of tertiary amines. Catalysts which have been found particularly effective in preparing polyisocyanurate foams include: 2,4,6-tris(dimethylaminomethyl)phenol; mixture of ortho and paradimethylaminoethylphenol; N,N',N''-tris(dimethylaminopropyl) - sym - hexahydrotriazine; N,N',N''-tris(dimethylaminopropyl) - sym - hexahydrotriazine; and diglycidyl ether of bisphenol; A(para, para'-isopropylidenediphenol); benzyl trimethylammonium hydroxide in dimethyl sulfoxide (as 25 percent solution); benzyl trimethylammonium methoxide, sodium methoxide (as saturated solution); N,N',N''-tris(3-dimethylaminopropyl)-sym-hexahydrotriazine; and N,N', N'' - trialkyl - sym - hexahydrotriazine/tertiary aliphatic amines.

In order to improve the foaming characteristics of the foregoing resinifiable components, additives are often included. One of these comprises an emulsifier or surfactant such as is disclosed in the publication entitled "Detergents and Emulsifiers—Up to Date (1960)" published by John W. McCutcheon, Inc., 475 5th Ave., New York, N.Y. These surfactants are used in relatively small amounts, for example, about 0.1 percent to about 3 percent based upon the organic components of the mixture. The surfactants may be non-ionic, anionic, cationic, or mixtures of two or more thereof. A representative member of the family is known as Tween 20 or Tween 21 and is described as polyoxyethylene sorbitan monolaurate. An example of a cationic surfactant comprises Hyamine 1622, which is described as diisobutyl phenoxy, ethoxy ethyl dimethyl benzyl ammonium chloride. The several classes of surfactants may be used singly or in combination.

Examples of surfactants which may be used include the so-called Pluronics, which have been described as being condensates of ethylene oxide with a hydrophobic base, formed by condensing propylene glycol. These are of the molecular weight in a range of about 2000 to about 8000 and are ascribed the formula

Another class of surfactants comprises the so-called Tetronics, which are formed by the addition of propylene oxide to ethylene diamine, followed by the addition of ethylene oxide. These compounds have been ascribed the formula:

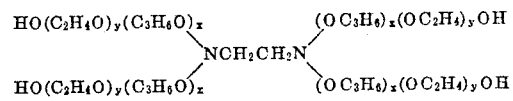

Another of the more satisfactory surfactants which has been found very effectively to maintain the cell structure in the foaming and curing of the instant foams comprises derivatives of the silicones. One such product is approximately of the formula:

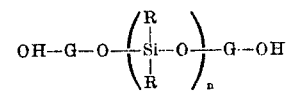

wherein G is the alkylene radical of a lower glycol, such as ethylene, propylene or butylene, and groups R are alkyl or hydroxy-substituted alkyl containing from 1 to about 4 carbon atoms, and $n$ is a number from 1 to about 20. It is a liquid product having a viscosity of 550 centipoises, refractive index of 1.4435, and a specific gravity at 25° F. of 1.02. One such material is sold as Dow-Corning 199. Still another highly useful silicon base surfactant comprises the so-called X-521 which has the structural formula:

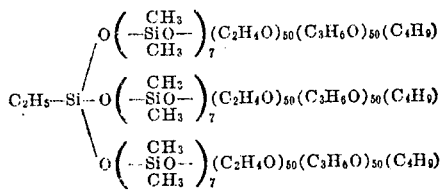

as well as L-5310, which is an organo-silicone block copolymer having the formula:

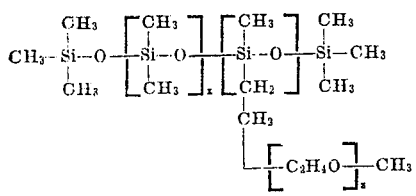

being a soft wax, having a melting point of 32° C.–35° C., a viscosity of 200–400 centistokes, a cloud point (1 percent water solution) of 64° C., and a specific gravity of 1.07 (35°/25° C.). The invention also includes the formation of filled foams in the substantial absence of surfactants. If surfactants are used, the amount thereof may be in a range of about 0.1 percent to about 5 percent based upon the total of the resinifiable components in the mixture.

BLOWING AGENTS

The term "blowing agent" is used to designate various agents that will produce a cellulated froth or foam-like body. For example, air or other fixed gas may be introduced by beating or by compression to produce foaming. Therefore, under the provisions of this invention, it is termed a "blowing agent." Volatile compounds, such as $CCl_3F$, may also be termed blowing agents, as may such chemicals as ammonium carbonate or nitrate, or diazoaminobenzene, which will decompose in the mixture to give foaming. These, under the terms of this invention, are blowing agents.

This invention includes the addition of a gas, such as carbon dioxide, nitrogen, argon, helium or air, to an interpolymerizable mixture under a considerable pressure so that a substantial amount thereof goes into solution. When the pressure is released, the gaseous medium in solution volatilizes to produce foam formation. The organic material is then cured.

Still other systems of blowing may be used. For example, the mixture may be subjected to an appropriate frothing operation as by whipping with carbon dioxide gas, air or nitrogen. A relatively volatile chlorofluorocarbon, such as $CCl_3F$, $CCl_2F_2$, or other similar agents, or a combination thereof with carbon dioxide or similar gaseous blowing agents may be introduced into the resin-filler mixture and allowed to foam and set to solid state. When the volatile chlorofluorocarbons are employed to produce foaming action, it is preferable that the foamable mixture be prechilled to a temperature of about 50° F. or to such other temperature as will effectively maintain the blowing agent in solution in the mixture. When the mixture is allowed to warm up in curing, the halocarbon volatilizes to provide a suitable foam structure containing the filler material in suspension therein.

In the case of the polyester resin binders, while these and other systems may be used in forming foamable mixtures in the practice of the present invention, a presently preferred system for producing foaming comprises the use of an alkali metal carbonate or bicarbonate and an acid, such as a freeze carboxyl acid. These react to liberate carbon dioxide in situ. The anhydride of the acid may be used in place of the acid, but water should also be added in order to split the anhydride ring thereof and thus regenerate carboxyl groups. The over-all result is substantially the same with either free carboxylic acid or the anhydride thereof. However, it will be apparent that the use of the anhydride and water does provide a time lag in the onset of the foaming action because time must be allowed after the mixing of the several ingredients to allow the water to split the anhydride rings before reaction between the carbonates and the free acid groups can take place. In this foaming process, potassium bicarbonate and sodium bicarbonate may be used in the alternative; however, sodium bicarbonate is usually preferred because it is considerably less expensive than the corresponding potassium compound.

Although the alkali metal compound is reacted with the organic acid to form a salt, the latter is still retained in the foam mixture and when the latter is highly heated, as, for example, to the charring or burning temperature, the alkali metal salt is decomposed to provide alkali metal oxide, which combines with the silica to form glass in situ. The latter retains much of the cellular structure of the charred mass in which it is formed.

Another method of blowing comprises reacting a portion of the isocyanate groups contained in the polymer mixture with water to generate carbon dioxide in situ.

THE REFRACTORY FILLERS

Many refractory inorganic materials in pulverulent state may be used as fillers in the foams. Many of these are oxides or carbides of metals. The heat resistant materials known as cermets (or the components thereof) may also be used. It will be recognized that silica ($SiO_2$) is an exceedingly common and inexpensive inorganic filler ingredient. Silica, it is to be recognized, may exist in amorphous as well as numerous crystalline states. The silica in pulverulent state, for example, of a particle size in a range of about 0.2 micron to about 550 microns or even larger, may be added to the starting organic binder. Either larger or smaller particle sizes may also be used. Pulverulent silica suitable for use in the practice of the invention may be obtained by grinding quartz or sand, or by grinding silica precipitated from sodium silicate, or by grinding so-called silica aerogel. It appears that in the event the pulverulent silica is amorphous, there is a conversion or transition thereof when the foam is subjected to high temperature, for example, to the temperature of charring or ultimate burning of the organic material, and the inorganic foamed product contains crystalline silica.

While the interaction of silica and fluxing agent provides glass, examination of the final inorganic foams herein disclosed shows that a major portion of the final foam structure consists of crystalline silica. Often the glass phase is difficult to detect even by examination of the foam with an optical microscope of considerable power. However, it must be present. Usually, in the sintered material, the body still contains about 90 percent to 99 percent of silica particles. The particles are sintered or bridged together by a small but largely invisible glass-like phase. In some instances, at least a part of the bond between the particles may be provided by co-crystallization between the particles of refractory material.

While silica in pulverulent state and flux may be used as the filler material of applicant's foams without other refractory additives, it is also contemplated to add to, or substantially completely to replace the silica by other refractory pulverulent materials, of which the following constitutes a partial list from which selection may be made:

$Al_2O_3$
$ZrO_2$ (with or without asbestos fibers)
$TiO_2$
$ThO_2$ (either commercial or nuclear grades and with or without asbestos fibers)
$Sb_2O_3$
$ZrO_2 + SiO_2$
$ZrO_2 + TiO_2$
$TiO_2 + SiO_2$
$Al_2O_3 + SiO_2$
Tungsten oxide
$Al_2O_3 + ZrO_2$
Boron oxide
Tungsten carbide
Boron carbide
Tungsten metal
Boron metal
Calcium zirconate
Magnesium zirconate
Asbestos fibers (various types) $+ SiO_2$
Fiber Frax (various types) $+ SiO_2$
Pluton fibers (organic) $+ SiO_2$
Quartz fibers $+ SiO_2$
White glass enamel (a powdered glass)
Vanadium pentoxide ($V_2O_5$)
Various natural and synthetic silicates
Eccospheres [1] "R" (alone)
Eccospheres "R" $+ SiO_2$
Eccospheres "Si" (alone)
Eccospheres "Si" $+ SiO_2$

[1] Eccospheres — minute hollow spheres of silica.

Mixtures of these various refractory fillers may be used. Cermets in pulverulent forms or the pulverulent forms of the components of cermets may also be used as the refractory filler components. Fluxes may also be used with the fillers, for example, powdered nickel and lead silicate, powdered chromium with aluminum silicate, tungsten with aluminum oxide or molybdenum, and with calcium and aluminum oxides. The foregoing combinations may also include brazing agents, such as niobium, titanium, tantalum and zirconium, to bond the ceramic particles to the metal particles. These brazing agents may also be used to bond refractory coatings to metallic substrates.

Organic or inorganic fibers, when incorporated along with the pulverulent materials above listed, have been found substantially to enhance the strength of foams, especially when they are in charred state or in the fully fired state wherein substantially all of the carbonaceous material has been ablated away. Appropriate refractory fibers comprise:

Asbestos
Quartz fibers
Glass fibers
Heat resistant organic fibers
Steel wire
Stainless steel wire and others. The inorganic fibers may be used in foams which are to be heated to relatively high temperatures.

Suitable refractory fibers include: asbestos, quartz fibers, glass fibers, heat resistant organic fibers, carbonaceous fibers, inorganic fibers, steel wire and stainless steel wire. Useful fibers include those described in Chemical Week, June 9, 1962, pp. 61–64; Materials in Design Engineering, October 1962, pp. 12–13; and Chemical Engineering Progress, October 1962, pp. 37–41.

Included among the fibrous materials described are zirconia fibers such as Zirconia A, a calcia-stabilized zirconia; Zirconia C and Zircon, silica-containing zirconias, Fiberfrax, aluminum silicate fibers; and carbonaceous fibers such as Pluton-B, Graphite, and Hitco-C fibers.

Preferably the fibers utilized in the compositions of this invention are selected from asbestos or alumina silicate fibers. The fibrous material may be employed in an amount in a range of about 0.25 percent to about 50 percent by weight based upon the inorganic refractory material. Usually the fibers are employed in an amount of about one percent by weight or higher.

FLUXES

Fluxing materials which may be used in combination with the various refractory filler materials in the foams of this invention comprise those which have heretofore been employed in the glass industry and comprise fusible compounds of metals of the first and second groups of the Periodic Table, such as:

sodium carbonate
sodium bicarbonate
potassium carbonate
potassium bicarbonate
sodium hydroxide
potassium hydroxide
calcium carbonate
calcium bicarbonate
magnesium carbonate
$BaCl_2$
$CaCl_2$
borax
$CH_3COONa$
calcium acetate
calcium formate
calcium borate
$Na_2SiO_3$ and others. Some of these have an added capacity of reacting with acids in the foamable mixture to generate carbon dioxide, thus giving foaming action. The amount of the fluxing agent is susceptible of considerable variation, dependent upon the degree of resistance to high temperature required in the products obtained, by heating the initial foams or the chars thereof to high temperatures. It is considered that most of the mixtures of filler and fluxing agent will comprise from about 1.0 percent to about 45 percent of the fluxing agent based upon the total mixture of the refractory filler and said fluxing agent; although amounts as low as 0.5 percent or even 0.2 percent in many cases may serve to some noticeable advantage.

In the formulation of foams in accordance with the provisions of the present invention, various isocyanate terminated prepolymers and mixtures thereof may be employed. The following constitute examples illustrating a few prepolymers and mixtures that may be used in the practice of this invention.

All parts, percentages and ratios throughout this specification are by weight unless otherwise indicated.

EXAMPLE A

A polyester was prepared from a mixture comprising:

| | Parts by weight |
|---|---|
| Diethylene glycol | 360.00 |
| Adipic acid | 992.00 |
| Stannous fluoride (catalyst) | 0.12 |
| Trimethylolpropane | 1002.00 | and had the following properties:

| | |
|---|---|
| Percent yield | 96.0 |
| Acid value (final) | 0.25 |
| Oh value | 367.5 |
| Brookfield viscosity @ 25° C., centipoises | 31,500 |
| Gardner color value | 3 |

This was designated "Polyester A."

Into a reaction vessel equipped with a stirrer, thermometer, reflux condenser and heating mantle was charged 1500 parts toluene diisocyanate, 176.5 parts of the above Polyester A were added incrementally over a period of 20 minutes. 88.3 parts of trimethylolethane were added, the pot temperature at this point being 57° C. The temperature was raised over a period of one hour to 92° C. The reaction mixture was then heated at 85° C. for an additional 1.5 hours. There was a small amount of solid material in the flask which was filtered off. The prepolymer had an NCO value of 127.3 (theoretical 127.5). This prepolymer is hereinafter referred to as "Prepolymer A."

EXAMPLE B

A sucrose-based polyether polyol and a prepolymer thereof were prepared utilizing the process taught by Wismer et al. in U.S. Pat. No. 3,152,002, which is incorporated herein by reference. The polyether polyol contained 1 mole of sucrose, 11 moles of propylene oxide and 4 moles of ethylene oxide. The polyol had a hydroxyl value of 460, and a viscosity of 28,000 centipoises at 25° C. The prepolymer was formed by reacting 78.5 parts by weight of toluene diisocyanate (which was a mixture of 80 percent of the 2,4 isomer and 20 percent of the 2,6 isomer) and 21.5 parts by weight of the above sucrose-based polyether polyol. The resultant prepolymer had an NCO equivalent of approximately 140 and a viscosity of 1500 centipoises. The prepolymer is hereinafter referred to as "Prepolymer B."

The following examples illustrate the composition, methods and practices for producing the inorganic foams of the invention, but the invention should not be construed as being limited to the details hereinafter set forth.

EXAMPLE I

The following base mixture was prepared:

| Base mixtures: | Parts by weight |
|---|---|
| Prepolymer A (same as Example A) | 200.0 |
| Surfactant (organopolysiloxane) | 2.0 |
| Refractory filler (SiO$_2$) | 202.0 |
| Asbestos fibers | 8.6 |
| Flux (NaHCO$_3$) | 34.0 |

A foamable mixture was formed as follows:

| Foamable mixture | Parts by weight |
|---|---|
| Base mixture (above) | 446.6 |
| Trichlorofluoromethane (blowing agent) | 6.0 |
| Catalyst (1/1 mixture of 2,4,6-tris(dimethylaminomethyl) phenol: diglycidyl ether of para,para'-isopropylidenediphenol) | 3.6 |

The base mixture was placed on an air stirrer and the blowing agent added and the mixture stirred until a uniform consistency was obtained. The catalyst was then added and the mixture stirred for one minute. The mixture was then poured into a 5" x 5" x 2½" mold and placed in an oven at 300° F. for 30 minutes.

The filled foam had a density of 34 pounds per cubic foot. The foam was fired in an electric tunnel kiln over an 8 hour cycle, being exposed to a maximum temperature of 1200° F. for about 60–75 minutes to produce a foam char having a density of 13.7 pounds per cubic foot. The foam retained most of its original shape and fine cell structure.

EXAMPLE II

The following base mixture was prepared:

| Base mixture: | Parts by weight |
|---|---|
| Prepolymer B (same as Example B) | 1428.0 |
| Surfactant (organopolysiloxane) | 14.3 |
| Refractory filler (SiO$_2$) | 1785.0 |
| Asbestos fibers | 76.0 |
| NaHCO$_3$ | 300.5 |

The above materials were mixed with an air powered stirrer until a uniform consistency was obtained.

A foamable mixture was then prepared as follows:

| Foamable mixture: | Parts by weight |
|---|---|
| Base mixture (as described above) | 450.0 |
| Trichlorofluoromethane | 5.0 |
| Catalyst (1/1 mixture of 2,4,6-tris(dimethylaminomethyl)phenol: diglycidyl ether of para,para'-isopropylidenediphenol) | 3.7 |

The blowing agent and catalyst were premixed and then added to the base mixture and stirred for 90 seconds. The material was then poured into a 5" x 5" x 2¼" mold. The mold was placed in an oven at 200° F. for thirty minutes and then allowed to cool. The filled foam had a density of 32.6 pounds per cubic foot.

The filled foam was fired in an electric tunnel kiln passing from room temperature to a maximum temperature of 1200° F. and back to room temperature over an 8-hour cycle. The resultant char was strong and had retained most of its original cell structure.

EXAMPLE III

This example shows the preparation of the foams of this invention employing water to generate carbon dioxide, in situ, as a blowing agent.

| Base mixture: | Parts by weight |
|---|---|
| Prepolymer A (same as Example A) | 1428.0 |
| Surfactant (organopolysiloxane) | 14.3 |
| Refractory material (Al$_2$O$_3$) | 2072.1 |
| Aluminum silicate fibers | 87.5 |
| NaHCO$_3$ | |

The above were mixed until uniform.

A foamable mixture was then prepared as follows:

| Foamable mixture: | Parts by weight |
|---|---|
| Base mixture (above) | 1600.0 |
| Catalyst (1/1 mixture of 2,4,6-tris(dimethylaminomethyl)phenol:diglycidyl ether para, para' - isopropylidenediphenol | 12.8 |
| Water | 1.6 |

The base mixture was placed in a container and then the catalyst added. The mixture was stirred for 1 minute. The water was added and the mixture stirred for 15 seconds. The mixture began to foam and was immediately poured into a 9" x 5" x 4" mold. The material foamed up to fill the mold.

The filled foam had a density of 31.0 pounds per cubic foot. It was a strong foam.

The filled foam was fired in a moving bed tunnel kiln over a 16-hour cycle, being exposed to a maximum temperature of 2850° F. for about 100–125 minutes. The product was a strong refractory foam with a density of 25.4 pounds per cubic foot which has a few superficial external cracks.

The foamed bodies in either the carbonaceous or the fired inorganic state could be cut by grinding or other means to provide regular and/or accurately formed shapes suitable for uses wherein accuracy as to size or shape of the parts is required.

In the formulation of foams in accordance with the provisions of the present invention, various polyester materials and mixtures thereof with various monomers may be employed. The following constitute examples illustrating a few polyesters and mixtures that may be used in the practice of this invention.

EXAMPLE C

In accordance with this example, a polyester was prepared comprising:

| | Moles |
|---|---|
| Maleic anhydride | 60 |
| Isophthalic acid | 40 |
| Propylene glycol | 35 |
| Triethylene glycol | 63 |

This mixture was cooked with an appropriate inhibitor of gelation, namely, 0.0012 percent of hydroquinone. The techniques of cooking were those conventional in the art and need not be elaborated upon herein. The finished polyester was thinned with 18 percent, based upon the mixture of styrene. It was stabilized with 0.2 percent of a salt of a quaternary ammonium compound (Hyamine 1622) and 0.01 percent of copper naphthenate. This polyester could be incorporated with refractory oxides of metals which are adapted to react with fluxes to form a glass. The mixtures, when heated to a sufficient temperature, would char to give a cellulated body. The latter, when further heated, would give foams as herein disclosed.

EXAMPLE D

In a like manner, a polyester was prepared comprising:

| | Moles |
|---|---|
| Ethylene glycol | 10.6 |
| Maleic anhydride | 4.0 |
| Tetrachlorophthalic anhydride | 6.0 |

This mixture was fusion cooked at 210° C. The resultant resin was thinned with 20 percent of styrene, based upon the mixture, and was stabilized with 0.02 percent of hydroquinone and 0.2 percent of Hyamine 1622. Also included was 0.05 percent of copper naphthenate in styrene. The resultant interpolymerizable mixture could be mixed with a refractory oxide and foamed and gelled. The foam could be heated first to form a char and finally to provide an inorganic cellular body.

EXAMPLE E

The esterification mixture in this example comprised:

| | Moles |
|---|---|
| Diethylene glycol | 11.0 |
| Maleic anhydride | 10.0 |
| Benzoic acid | 0.5 |

The foregoing mixture was stabilized with 0.02 percent of hydroquinone and was cooked in conventional manner to provide a polyester which is thinned with 20 percent, based upon the mixture, of monomer (styrene). This mixture could also be compounded first to give an organic foam, and finally to give an inorganic cellular body.

EXAMPLE F

The polyester of this example comprised equal moles of maleic anhydride and phthalic anhydride, esterified with approximately an equivalency of diethylene glycol. The acid value of the polyester was about 40 and the hydroxyl value was about 5. This polyester was made up into a filled mixture, foamed and cured.

In forming the heat-resistant, cellular bodies contemplated by the present invention, using any of the foregoing resins, the refractory metal oxides, carbides, etc., herein disclosed may be used as the refractory filler material. The refractory fillers are blended into an unsaturated polyester resin along with the fluxing agent, as well as other materials disclosed and the mixture foamed.

The product of foaming and interpolymerization may be heated in an appropriate apparatus, such as an electrically or gas-heated furnace, or a moving bed kiln, to a temperature in a range of about 800° F. to about 1200° F., or higher, whereby the organic foamed binder is burned away, leaving a cellular char of a body wherein the scaffolding for the pulverulent refractory material is a char of the original organic material. It is of good strength and contains about 20 percent to 30 percent of closed cells.

Assuming that the inorganic refractory filler material is silica, the chars, if heated to about 1800° F. to about 2200° F., are converted to a coherent inorganic material. The product has substantially greater mechanical strength than the char and the percentage of closed cells is about 20 percent to about 70 percent. The resultant inorganic cellular product will resist temperatures above 2200° F. The products of highest resistance to heat are obtained by increasing the proportion of higher melting metal oxides and carbides, and concomitantly lowering the amount of fluxing agent. In the case of higher melting refractory fillers, such as alumina and zirconia, the chars must be heated to higher temperatures to produce the strongest refractory foams. Temperatures between about 2600° F. and 4000° F. are usually employed, preferably between 2800° F. and 3200° F.

In order to obtain inorganic foams of the highest strength and most uniform structure, the filled organic foam may be heated incrementally or continuously from its ambient temperature to the maximum temperature over a period of time and in such a manner that the temperature differential between the outer portions of the cellular body and the inner portions of the cellular body are not so great as to cause fissures, crazing, or lack of uniform structure. Likewise, the inorganic foam may be annealed after formation, that is, cooled at such a rate that undue internal stresses or thermal shock are avoided.

The foams from which the organic material has been removed are usually of lower density than those containing the organic binders still intact.

Foamed bodies still containing the organic material and being of densities of about 60 to about 95 pounds per cubic foot may be used as ablation agents. The strength of the foamed materials of such density may be increased by incorporating fibers of refractory materials, such as asbestos or silica fibers or fiber glass, or other heat resistant fibers, along with the refractory material.

The following constitute examples illustrating the preparation of foams initially containing polyester binder along with inorganic refractory fill material, and being adapted for heat treatment, to provide a char and/or to provide a coherent inorganic foam. In these examples, the foams of the foregoing examples were used.

EXAMPLE IV

The filled interpolymerized mixture comprised:

| | Grams |
|---|---|
| Polyester (same as Example F) | 9100.0 |
| Silica | 5510.0 |
| Sodium bicarbonate | 2540.0 |
| Cellulose acetate butyrate (film former) | 182.0 |
| Styrene | 1100.0 |
| Cobalt octoate (accelerator) | 18.2 |
| Fumaric acid (foam stabilizer) | 27.3 |
| Hyamine [1] 1622 | 27.3 |
| Tween 20 (emulsifier) | 45.5 |
| Copper naphthenate (accelerator) | 4.6 |

[1] Hyamine 1622—A quaternary ammonium salt, i.e., diisobutyl phenoxy ethoxy ethyl dimethyl benzyl ammonium chloride, is helpful in several respects. It prevents premature gelling of the uncatalyzed mixture. It is a cationic surfactant and assists emulsification. It also may promote gelation after catalyst is added. However, useful foams may be obtained without employment of the same.

This mixture was blended under pressure with $CO_2$ at a rate of 0.5 gram of $CO_2$ per 100 grams of resin to give a froth or foam. One sample of this mixture was catalyzed with 1 percent by weight based upon the total formulation of methyl ethyl ketone peroxide. A second sample was catalyzed with 0.5 percent upon a like basis of the same catalyst. The mixture was cured without extraneous heat to provide a foam.

The foam, fired in an electric tunnel kiln over an 8-hour cycle, being exposed to a maximum temperature of 1200° F. for about 60–75 minutes produces a carbonaceous foam char retaining most of its original shape and cell structure.

A similar foam fired in a moving bed tunnel kiln over a 16-hour cycle being exposed to a maximum temperature of 2000° F. for about 100–125 minutes produces a strong refractory foam.

The following examples illustrate the forming of filled organic foams wherein water and maleic anhydride are added to provide free maleic acid to react with the alkali metal bicarbonate for purposes of generating carbon dioxide in situ.

EXAMPLE V

In this example, asbestos fiber was added in order to enhance the strength of the foam structure in its several stages. In forming the foam, a base mixture was prepared comprising:

Base mixture: Grams
Polyester-monomer mixture (same as Example C) _____ 350.0
Cellulose acetate butyrate (dissolved in 35 grams of styrene) (optional) _____ 7.0
Fumaric acid (optional) _____ 1.0
Emulsifier (Tween 20) (optional) _____ 1.7
Additional monomer (styrene) (optional) __ 160.0
Refractory filler ($SiO_2$) _____ 672.0
Foaming agent and flux ($NaHCO_3$) _____ 128.0
Asbestos fibers _____ 45.0

The foamable mixture comprised:

Foamable mixture: Grams
Base mixture (as above described) _____ 1200
Accelerator (cobalt octoate) (optional) ____ 2
Maleic anhydride (part of the foaming system) _____ 12
Added styrene (optional) _____ 40
Dicyandimide (optional) _____ 30

The final additives comprised:

Final additions: Grams
Water (part of the foaming system) _____ 24.0
Catalyst (DDM)[1] (optional) _____ 2.4

[1] DDM is a 40 percent solution of methyl ethyl ketone peroxide in dibutyl phthalate.

The resultant mixture was poured into a mold where it slowly foamed and gelled to provide an interpolymer foamed resin of a density of 30.2 pounds per cubic foot.

The foam fired in an electric tunnel kiln over an 8-hour cycle, being exposed to a maximum temperature of 1200° F. for about 60–75 minutes, produces a carbonaceous foam char retaining most of its original shape and cell structure.

EXAMPLE VI

The base material in this example comprised:

Base mixture: Grams
Polyester-monomer mixture (see Example C) _ 54.6
Emulsifier (Tween 20) _____ 0.27
Cell strengthener (cellulose acetate butyrate in 5.5 grams of styrene) _____ 1.1
Refractory filler (tungsten oxide) _____ 109.7
Blowing agent and flux ($NaHCO_3$) _____ 13.0

The foamable mixture comprised:

Foamable mixture: Grams
Base mixture _____ 170.0
Styrene _____ 7.0
Cobalt octoate _____ 0.3
Maleic anhydride _____ 2.0
Dicyandimide _____ 4.1
Final additives:
Water _____ 3.4
Methyl ethyl ketone peroxide (DDM) _____ 0.3

The mixture was stirred and poured into a mold wherein it foamed and gelled in 6 minutes. The foamed material was subsequently fired at 1800° F.

EXAMPLE VII

In this example, a mixture of silicone dioxide and zirconium dioxide was employed as the glass-forming agent. The base mixture was of the composition:

Base mixture: Grams
Interpolymerizable mixture (same as Example C) _____ 84.5
Emulsifier (Tween 20) _____ 0.42
Cell strengthener (cellulose acetate butyrate in 18.5 grams of styrene) _____ 1.7
Refractory filler ($SiO_2$) _____ 85.0
Refractory filler (zirconium dioxide) _____ 85.0
Blowing agent and flux ($NaHCO_3$) _____ 21.0

The foamable mixture comprised:

Foamable mixture: Grams
Base mixture _____ 277.0
Accelerator (cobalt octoate) _____ 0.51
Maleic anhydride _____ 3.0
Dicyandimide _____ 7.5
Added styrene _____ 8.0
Final additives:
Water _____ 6.0
Methyl ethyl ketone peroxide _____ 0.6

The mixture was poured into a mold and was found to foam and gel in 19 minutes. The foam density of the product was 27.2 pounds per cubic foot.

The foam, fired in an electric tunnel kiln over an 8-hour cycle, being exposed to a maximum temperature of 1200° F. for about 60–75 minutes produces a carbonaceous foam char retaining most of its original shape and cell structure.

A similar filled foam fired in a moving bed tunnel kiln over a 16-hour cycle, being exposed to a maximum temperature of 2800° F. for about 100–125 minutes, produces a strong refractory foam.

A similar formulation where the refractory fillers were replaced with boron trioxide produced carbonaceous foams and refractory foams.

EXAMPLE VIII

In this example, the interpolymerizable mixture of polyester component and monomer component itself contained a plurality of polyesters. The base component of the foamable mixture was made up to comprise:

Base mixture: Grams
Interpolymerizable mixture of Example D ___ 45.7
Interpolymerizable mixture of Example C ___ 9.0
Surfactant (Tween 20) _____ 0.42
Cellulose acetate butyrate (in 5.5 grams of styrene) _____ 1.10
Refractory filler material (magnesium zirconate) _____ 110.0
Blowing agent and flux ($NaHCO_3$) _____ 13.5
Added styrene _____ 8.0

The foamable mixture comprised:

Foamable mixture: Grams
Base mixture (as described above) _____ 185.0
Added styrene _____ 8.0
Cobalt octoate _____ 0.38
Maleic anhydride _____ 1.5
Dicyandiamide _____ 4.0
Final additives:
Water _____ 2.5
Methylene ethyl ketone peroxide _____ 0.4

The foregoing mixture was poured into a mold and foamed and gelled within a period of 5 minutes. The foamed product can be fired to produce a char of inorganic foam.

EXAMPLE IX

In this example, a mixture of 62 parts of boron carbide and 107 parts silica was employed as a refractory filler material in place of the filler of Example VII. Also only 51 parts of $NaHCO_3$ were employed. The foams were fired in a similar manner to Example VII.

EXAMPLE X

Example IX was repeated, replacing the fillers with 107 parts $SiO_2$ and 62.0 parts of tungsten carbide.

EXAMPLE XI

In this example, a mixture of a number of different highly melting oxides of metals was employed as a filler material. The base composition comprised:

| Base mixture: | Grams |
|---|---|
| Interpolymerizable mixture (same as Example C) | 200.0 |
| Surfactant (Tween 20) | 1.0 |
| Cell strengthener (cellulose acetate butyrate in 20 grams of styrene) | 4.0 |
| Added styrene | 80.0 |
| $SiO_2$ | 221.0 |
| $Al_2O_3$ | 192.0 |
| $TiO_2$ | 6.5 |
| Calcium oxide | 75.0 |
| $Fe_2O_3$ | 3.0 |
| MgO | 1.0 |
| Blowing agent and flux ($NaHCO_3$) | 20.0 |

The foamable mixture comprised:

| Foamable mixture: | Grams |
|---|---|
| Base composition | 300.0 |
| Cobalt octoate | 0.51 |
| Added styrene | 5.0 |
| Maleic anhydride | 3.0 |
| Dicyandiamide | 7.50 |
| Final additive: | |
| Water | 6.0 |

The foam fired in an electric tunnel kiln over an 8-hour cycle, being exposed to a maximum temperature of 1200° F. for about 60–75 minutes produces a carbonaceous foam char retaining most of its original shape and cell structure.

The filled foam fired in a moving bed kiln over a 16-hour cycle being exposed to a maximum temperature of 2800° F. for about 100–125 minutes produces a strong refractory foam.

EXAMPLE XII

In this example, titanium dioxide was employed as the refractory filler material. The base mixture in this instance was of the following composition:

| Base mixture: | Grams |
|---|---|
| Interpolymerizable mixture (same as Example C) | 125.0 |
| Surfactant (Tween 20) | 0.6 |
| Cell strengthening agent (cellulose acetate butyrate) | 2.5 |
| Added styrene | 56.7 |
| Titanium dioxide | 249.5 |
| Blowing agent and flux ($NaHCO_3$) | 62.5 |

The foamable mixture comprised:

| Foamable mixture: | Grams |
|---|---|
| Base mixture | 400.0 |
| Cobalt octoate | 0.68 |
| Added styrene | 6.0 |
| Maleic anhydride | 4.0 |
| Dicyandiamide | 10.0 |
| Final additives: | |
| Water | 8.0 |
| Methyl ethyl ketone peroxide | 0.8 |

The resultant mixture foamed gently and gelled in a period of 6 minutes. The resultant foam had a density of 48.3 pounds per cubic foot. The foam was fired in an oven first to a temperature of 1100° F. and then to 1640° F., over a period of 1 hour and 33 minutes. Subsequently, it was fired to a temperature of 1800° F. over a period extending up to approximately 15 hours. The resultant sample was hard and strong, and had a density of 40.0 pounds per cubic foot.

EXAMPLE XIII

In this example, fumaric acid is used to react with the sodium bicarbonate in order to generate carbon dioxide to foam the mixture. The base composition comprised:

| Base mixture: | Grams |
|---|---|
| Interpolymerizable mixture (same as Example C) | 150.0 |
| Cell strengthening agent (cellulose acetate butyrate in 15 grams of styrene) | 3.0 |
| Fumaric acid | 0.43 |
| Surfactant (Tween 20) | 0.73 |
| Added styrene | 79.3 |
| $SiO_2$ | 288.0 |
| Blowing agent and flux ($NaHCO_3$) | 55.0 |
| Aluminum silicate fibers | 20.0 |

The foamable mixture comprised:

| Foamable mixture: | Grams |
|---|---|
| Base mixture | 100.0 |
| Cobalt octoate | 0.17 |
| Maleic anhydride | 0.66 |
| Dicyandiamide | 2.33 |

The components were further mixed with 0.66 milliliter of water and 2 grams of methyl ethyl ketone peroxide.

The mixture was poured into a mold and foamed to provide a product of a density of 83 pounds per cubic foot.

A second portion, which was the same as the above except that 1 milliliter of water was added, likewise was poured into a mold and gave a foam of a density of 69 pounds per cubic foot.

The foam, fired in an electric tunnel kiln over an 8-hour cycle, being exposed to a maximum temperature of 1200° F. for about 60–75 minutes produces a carbonaceous foam char retaining most of its original shape and cell structure.

The filled foam fired in a moving bed tunnel kiln over a 16-hour cycle, being exposed to a maximum temperature of 2000° F. for about 100–125 minutes, produces a strong refractory foam.

EXAMPLE XIV

| Base mixture: | Grams |
|---|---|
| Interpolymerizable mixture (same as Example E) | 434.0 |
| Interpolymerizable mixture (same as Example C) | 150.5 |
| Surfactant (Tween 20) | 3.1 |
| Styrene | 115.0 |
| Cell strengthener (cellulose acetate butyrate dissolved in the styrene) | 10.2 |
| Asbestos fibers | 58.5 |
| Refractory filler ($SiO_2$) | 783.0 |
| Blowing agent and flux ($NaHCO_3$) | 150.0 |

The foamable mixture comprised:

| Foamable mixture: | Grams |
|---|---|
| Base mixture (as above) | 1700.0 |
| Cobalt octoate | 3.4 |
| Maleic anhydride | 14.3 |
| Dicyandiamide | 41.0 |

To the foregoing mixture the final additives were then added as follows:

| Final additives: | Grams |
|---|---|
| Water | 24.0 |
| Catalyst (methyl ethyl ketone peroxide) | 4.4 |

One portion of the mixture was poured into a mold and foamed and gelled in about 18 minutes. The density of the foam was 27 pounds per cubic foot. The foam had a good cell structure and a good surface. The foamed product was then fired at a temperature up to about 1720° F. over a total period of 7 hours and 45 minutes. The resultant product was a very strong, cellular product having no visible internal cracking. The compressive strength thereof was 868 pounds per square inch.

A second portion of the mixture was poured into a mold and foamed, and was then fired at a temperature up to 1200° F. in order to char the same, firing being continued for 9 hours and 40 minutes. The carbonaceous foam, when removed from the furnace, was still of good structure and was not warped, and there were no internal cracks. The volume was 76.6 percent of the original volume and the density was 24.7 pounds per cubic foot. The closed cells were 24.4 percent of the total cell structure.

A further sample of the material was fired at a temperature up to 1700° F. over a period of 8 hours and 15 minutes. The resultant foamed product was sintered, but there was no apparent cracking. The properties of the foam were as follows:

Density—29.0 pounds per cubic foot
Flexural strength—311 pounds per square inch
Modulus—$1.09 \times 10^5$
Closed cells—34.2 percent The carbonaceous foams and inorganic refractory foams hereinabove disclosed are employed as molds or as portions of molds prepared from dissimilar materials which molds are utilized in the casting or molding of molten metals such as iron, steel, aluminum, copper, brass, bronze, tin, lead, zinc, or in fact, any metal with a melting point below the melting point of the material which constitutes the mold.

The foams of the instant invention constitute extremely useful molds or portions of molds due to the excellent strength displayed by these materials, as well as their ability to be cut or machined to an accurate configuration. Further, since the green precursor foam may be molded to a predetermined shape and then fired, it is possible to produce configurations which are adaptable to molding without further workup after firing.

Since the foams of the invention are of exceptionally low density considering the weight of typical solid refractories, and since the thermal conductivity of the foams can be varied with density and materials and is frequently unique considering the materials of construction, beneficial results may be obtained by utilizing the foams of the invention in constructing molds of dissimilar materials, for example, the more typical sand, shell, or ingot mold to produce varied cooling rates in various sections of the mold or casting. This ability is especially useful in the casting of intricate shapes, in gate construction, mold top or hot top construction, since cooling in the various parts of the mold must occur in such a manner that the mold chills uniformly and completely to avoid internal stresses.

EXAMPLE XV

| Base mixture: | Parts by weight |
|---|---|
| Interpolymerizable mixture (same as Example C) | 933.0 |
| Interpolymerizable mixture (same as Example D) | 488.0 |
| Surfactant (Tween 40) | 6.6 |
| Styrene | 278.0 |
| Cellulose acetate butyrate (dissolved in above styrene) | 24.0 |
| Asbestos fibers | 81.3 |
| $SiO_2$ | 1900.0 |
| $NaHCO_3$ | 320.0 |

The above mixture was blended with an air stirrer at elevated temperature and cooled.

| Foamable mixture: | Parts by weight |
|---|---|
| Base mixture | 100.0 |
| Benzoyl peroxide/styrene (50/50) | 4.0 |
| Maleic anhydride | 11.0 |

The above mixture was well blended and 10 parts of water added and blended for 90 seconds. 0.85 part of diethylaniline were then added and stirred for 60 seconds. The material was poured into 9" x 5" x 3" wooden molds and allowed to foam.

A second foam was prepared as above except that 15.0 parts of water and 0.75 part of diethylaniline were employed.

The foams were fired in an electric tunnel kiln over an 8-hour cycle, being exposed to a maximum temperature of 1200° F. for about 60–75 minutes, producing a carbonaceous foam char retaining most of its original shape and cell structure.

Similar foams were fired in a moving bed tunnel kiln over a 16-hour cycle, being exposed to a maximum temperature of 2000° F. for about 100–125 minutes, and produced strong refractory foams.

A hemispherical cavity was cut into each of the above foams and molten steel was poured into each cavity and allowed to cool. The steel hemispheres were easily removed from the molds. Examination of the mold showed it to be intact. Similar results were obtained in casting molten brass.

All parts and percentages throughout the specification are by weight unless otherwise designated.

While specific examples of the invention have been set forth hereinabove, it is not intended to limit the invention solely thereto, but to include all the variations and modifications thereof which are within the scope of the appended claims.

I claim:
1. In a method of casting metals, the steps comprising:
   (A) forming a mold from a material comprising a foamed refractory formed by a method comprising heating a composition, comprising:
      (1) a foamed, thermoset resin selected from the group consisting of unsaturated polyester resins and isocyanurate resins, having dispersed therein
      (2) a refractory pulverulent inorganic filler and
      (3) a fluxing agent which is a fusible compound of a metal selected from the first and second groups of the Periodic Table,
   at a temperature and for a time at least sufficient to convert the organic binder into a carbonaceous structure, thereby providing a coherent cellular body, or for a time and at a temperature sufficient to consume the organic binder or carbonaceous structure to provide a coherent cellular body having inorganic refractory particles bonded together at points of contact;
   (B) introducing molten metal into said mold; and
   (C) cooling said mold until said metal solidifies.
2. A method as in claim 1 wherein the filler (2) is a refractory inorganic oxide.
3. A method as in claim 1 wherein the foam contains, in addition, (4) a heat-resistant fibrous material.
4. A method as in claim 3 wherein the filler (2) is a refractory inorganic oxide.
5. A method as in claim 4 wherein the fluxing agent (3) is selected from the group consisting of alkaline metal and alkaline earth metal, carbonates, bicarbonates, oxides, hydroxides and carboxylic acid salts.
6. A method as in claim 5 wherein the refractory inorganic oxide comprises alumina.
7. A method as in claim 4 wherein the refractory inorganic oxide comprises silica.
8. A method as in claim 7 wherein the fluxing agent (3) is selected from the group consisting of alkaline metal and alkaline earth metal, carbonates, bicarbonates, oxides, hydroxides and carboxylic acid salts.
9. A method as in claim 1 wherein the thermoset resin (1) is an unsaturated polyester.

10. A method as in claim 9 wherein the filter (2) is a refractory inorganic oxide.

11. A method as in claim 9 wherein the foam contains, in addition, (4) a heat-resistant fibrous material.

12. A method as in claim 11 wherein the filter (2) is a refractory inorganic oxide.

13. A method as in claim 12 wherein the fluxing agent (3) is selected from the group consisting of alkaline metal and alkaline earth metal, carbonates, bicarbonates, oxides, hydroxides and carboxylic acid salts.

14. A method as in claim 13 wherein the refractory inorganic oxide is alumina.

15. A method as in claim 12 wherein the refractory inorganic oxide comprises silica.

16. A method as in claim 15 wherein the fluxing agent (3) is selected from the group consisting of alkaline metal and alkaline earth metal, carbonates, bicarbonates, oxides, hydroxides and carboxylic acid salts.

17. A method as in claim 9 wherein the composition is heated to a temperature and for a time sufficient to form a carbonaceous refractory body.

18. A method as in claim 17 wherein the filter (2) is a refractory inorganic oxide.

19. A method as in claim 17 wherein the foam contains, in addition, (4) a heat-resistant fibrous material.

20. A method as in claim 9 wherein the filter (2) is a refractory inorganic oxide.

21. A method as in claim 20 wherein the fluxing agent (3) is selected from the group consisting of alkaline metal and alkaline earth metal, carbonates, bicarbonates, oxides, hydroxides and carboxylic acid salts.

22. A method as in claim 21 wherein the refractory inorganic oxide is alumina.

23. A method as in claim 20 wherein the refractory inorganic oxide comprises silica.

24. A method as in claim 23 wherein the fluxing agent (3) is selected from the group consisting of alkaline metal and alkaline earth metal, carbonates, bicarbonates, oxides, hydroxides and carboxylic acid salts.

25. A method as in claim 9 wherein the composition is heated at a temperature and for a time sufficient to form a coherent cellular body having inorganic refractory particles bonded together at points of contact.

26. A method as in claim 25 wherein the filler (2) is a refractory inorganic oxide.

27. A method as in claim 25 wherein the foam contains, in addition, (4) a heat-resistant fibrous material.

28. A method as in claim 27 wherein the filler (2) is a refractory inorganic oxide.

29. A method as in claim 28 wherein the fluxing agent (3) is selected from the group consisting of alkaline metal and alkaline earth metal, carbonates, bicarbonates, oxides, hydroxides and carboxylic acid salts.

References Cited

UNITED STATES PATENTS

| | | | |
|---|---|---|---|
| 3,175,918 | 3/1965 | McGahan et al. | 260—2.5X |
| 2,752,653 | 7/1956 | Emblem et al. | 164—45 |
| 3,193,893 | 7/1965 | Ross et al. | 164—45X |

FOREIGN PATENTS

| | | | |
|---|---|---|---|
| 694,095 | 9/1964 | Canada | 264—41 |

PHILIP E. ANDERSON, Primary Examiner

U.S. Cl. X.R.

106—40, 86; 260—2.5; 264—42, 44, 54